Feb. 7, 1967  M. F. DAVIS  3,303,248
PROCESS OF HEAT SEALING A NECK FOR BLOW MOLDED DRUM LINER
Filed Oct. 7, 1963
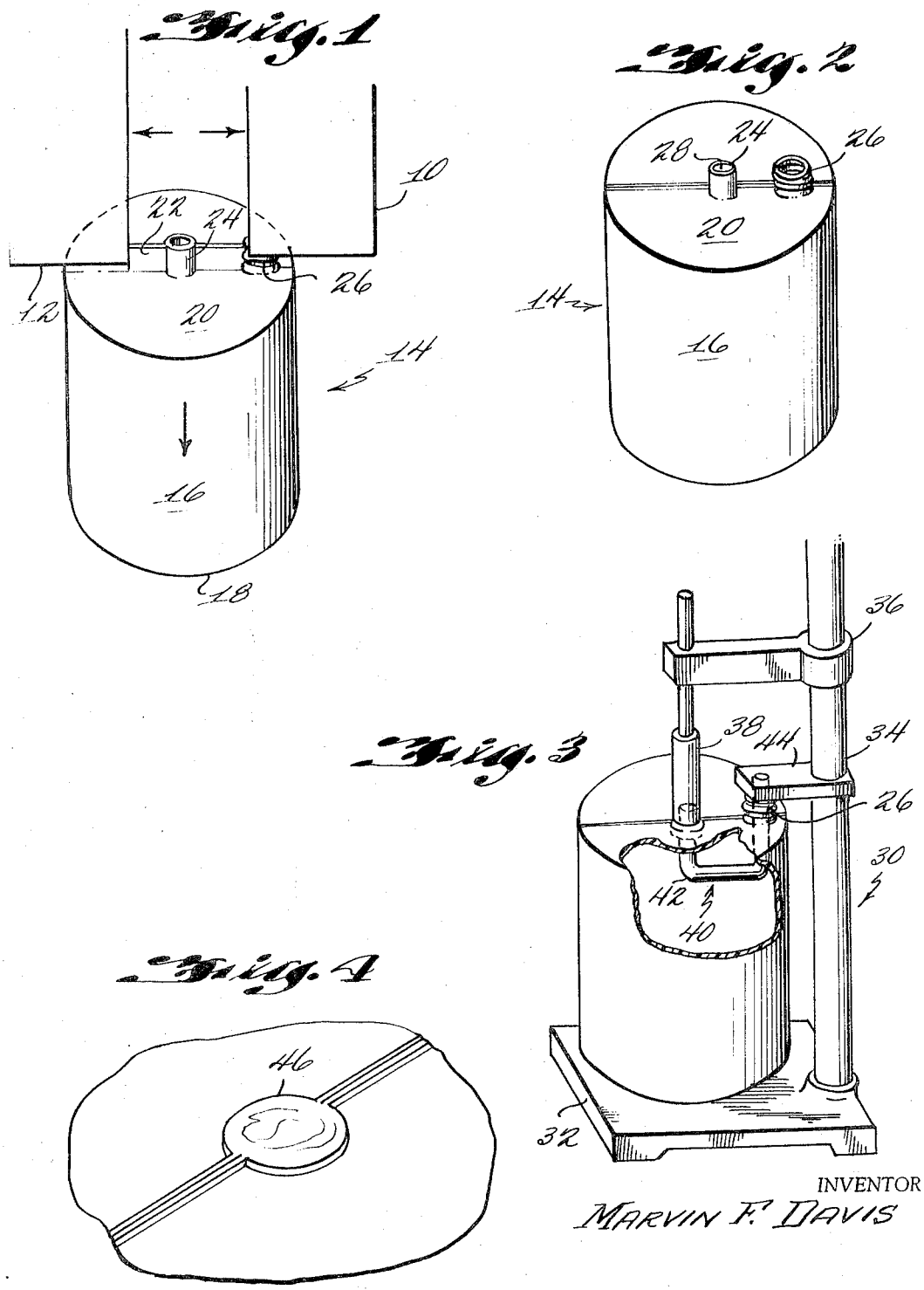
INVENTOR
MARVIN F. DAVIS
BY Cushman, Darby & Cushman
ATTORNEYS United States Patent Office 3,303,248
Patented Feb. 7, 1967

3,303,248
PROCESS OF HEAT SEALING A NECK FOR BLOW MOLDED DRUM LINER
Marvin F. Davis, Wilmington, Del., assignor, by mesne assignments, to The Greif Bros. Cooperage Corporation, Delaware, Ohio
Filed Oct. 7, 1963, Ser. No. 314,104
3 Claims. (Cl. 264—98)

This invention relates to a method of making cylindrical drum liners.

Containers of various sorts are used throughout industry and one of the standards which has become widely used is the 55 gallon drum. In using these 55 gallon drums it has been found that many times they may be reused and accordingly it has become the practice in industry to clean these drums after they have been used to prepare them to accept new material or even the same material and not contaminate the refill charge. To accomplish this result it will be appreciated that a large inventory of containers is necessary, some being filled with the material in storage or in transit, others in an empty condition awaiting filling and yet others undergoing a cleaning process. Such a large inventory unnecessarily involves a tremendous amount of handling and a consequent use of valuable storage and/or loading dock space that could be put to other uses. Aside from this problem industry has also been faced with a problem associated with another type of container, i.e., a fiber drum which has become important because of its low cost of manufacture as a substitute for metal drums. It has long been recognized that if a fiber drum could be made suitable for shipment of liquids, it would then begin to find application which thus far have been primarily delegated to liquid type metal drums. For this reason, considerable effort has been spent to find way and means of achieving a satisfactory liquid container in the form of a fiber drum. One of these approaches has been to coat the fiber itself with various synthetic materials, either by coating the inside of the complete package or by laminating thermoplastic films to the paper from which the drum is made, before the paper is wound into the cylindrical side wall.

A popular approach to both problems in addition to the one mentioned above with regard to fiber drums has been to fabricate a separate liner from a thermoplastic film, which is then inserted into the completed fiber or metal drum to prevent the contents from coming in contact with the insides of the drum. One conventional method of manufacturing such liners is by a blow molding process. According to such a procedure a required length of plastic tubing is extruded through an annular nozzle to form a parison, a mold is closed around the extruded length of tube (parison) and compressed air is admitted into the length of tube enclosed by the mold to inflate the tube to conform with the shape of the mold cavity. This procedure is illustrated in Hagen Patent 2,787,023 and Martin Patent 3,078,508. The compressed air generally is admitted into the length of tube through a nozzle inserted into the lower or upper end of the extruded length of tube. The nozzle generally is sealingly engaged by an upwardly extending integral liner material portion. After the blown article has rigidified within the mold, the air pressure is removed, the mold opened and the article ejected.

Particularly when it is desired to provide an outlet integral with the top of the liner, said outlet comprising an upwardly extending tube or neck which can subsequently be threaded on the exterior wall thereof and when such outlet is required to be offset from the center of the top of the liner a problem has been encountered in sealing the centrally disposed air-nozzle inlet in the end wall, top or bottom, of the molded liner. Heretofore and approach to this problem has been to prepare a "patch" of the thermoplastic material from which the liner is fabricated and then seal the patch in the aperture after the upwardly extending nozzle engageable length of tube has been severed, leaving the aperture flush with the end wall formed. Such a method involves tedious fitting procedures and care must be taken in order to provide a patch of the same material from which the liner is fabricated. It will be readily appreciated that when liners fabricated from many different types and grades of plastic material are produced in a single plant unnecessary time and labor are expended in insuring an efficient operation.

Another object of the instant invention is to provide a method for efficiently producing a plastic liner or continer having an offset outlet.

Yet another object of the instant invention is to provide a method for sealing a centrally disposed compressed air inlet while air pressure is still provided at the interior thereof or where the liner has been removed from the mold.

Other and additional objects will become apparent hereinafter.

In the accompanying drawings:

FIGURE 1 is a perspective view of a cylindrical drum liner leaving the mold;

FIGURE 2 is a perspective view of a cylindrical drum liner having the flash removed from the top of the liner and the air-nozzle inlet trimmed to the appropriate height.

FIGURE 3 is a perspective view of one embodiment of the invention for sealing the air-nozzle inlet.

FIGURE 4 is a perspective view of the sealed air-nozzle inlet.

Referring now to the drawings a length of polyethylene tubing which has been extruded and blow molded in a conventional manner, e.g., as shown in the Martin patent, is surrounded by parts 10 and 12 of the mold in an open position to eject the plastic liner 14 having a cylindrical wall 16, a flat bottom 18 and substantially flat top 20. The top 20 has, as it is ejected, flash 22 which engages the top surface of top 20 and the side walls of air-nozzle inlet 24 and outlet 26. In FIGURE 2, the flash has been removed and the air-nozzle inlet trimmed to a height sufficient to provide sealing material for aperture 28. In FIGURE 3 the molded liner 14 is supported on sealing means 30 having a base member 32, which supports a tubular rod 34. Slidably and pivotably mounted on rod 34 is arm 36 from which depends sealing means 38 which in one embodiment can be connected to a suitable source of heat (not shown) to provide heat sealing means. Also attached to rod 34 is seal support means 40 comprising back-up support 42 removably depending from fixed support 44.

In accordance with one embodiment of the invention a plastic liner 14 after ejection from a mold is treated to remove "flash" or excess material and to trim the air-nozzle inlet to a height sufficient to provide sealing material to the air-nozzle aperture in the top of the liner. Subsequently through the liner's outlet 26 there is inserted back-up sealing support 42 attached at one end to sealing means 30. The other end of sealing support 42 is positioned under the area including an air-nozzle aperture. Sealing means 38 are then caused to engage the upwardly extending side walls of air-nozzle inlet 24 and press them into the air-nozzle aperture. Sufficient heat is then transmitted to the plastic material in the aperture to provide a seal 46 as shown in FIGURE 4. The back-up support 42 is then removed through the outlet 26 which then may be provided with threads on its external upward extending walls if they have not previously been provided to this element.

According to an alternative procedure prior to being ejected from the blow mold, the upward extending wall of the air-nozzle inlet can be trimmed to the desired height, pressed into the aperture and heat sealed by sealing means 38. The air pressure present in the interior of the liner while still in the mold provides sufficient back-up support during the sealing operation and hence the seal support means 40 can be omitted.

In the preferred embodiment of the invention the plastic liner 14 is formed from a polyolefin film such as polyethylene, polypropylene, ethylene-propylene copolymers (e.g., 80:20), ethylene-butene-1 copolymer (90:10). However, the invention is not restricted to drum liners formed of such material. In general any thermoplastic flexible film can be used. Film formed of cellulose butyrate, cellulose acetates, acrylonitrile-butadiene-styrene, tripolymer, nylon (extrusion or molding), vinylidene chloride copolymers, e.g., vinylidene chloride-vinyl chloride (80:20), copolymers of vinyl chloride and vinyl acetate (e.g., 87:13) polyvinyl chloride, rubber hydrochloride, Teflon (polytetrafluoroethylene), polymeric trifluorochloroethylene, polystyrene, polycarbonate (e.g., from bisphenol A and diphenyl carbonate) ethyl cellulose, cellulose nitrate, polyurethane, irradiated polyethylene (e.g., irradiation of 2 to 30 megarads, preferably about 10 megarads) are additional illustrative examples of plastic materials capable of use in this invention. The thickness of the film can be from about 1 to 300 mils.

Alternatively outlet 26 need not be formed during the molding process. An aperture can be provided subsequent to ejection of the liner from the mold and a preformed threaded upwardly extending neck can be sealingly attached to the top of the liner subsequent to sealing the air-nozzle aperture according to this invention.

The containers employed in the present invention can either be liners for other containers, e.g., 55 gallon fiber drum liners, or they can be the final container itself.

Since it is obvious that various changes may be made in the above description without departing from the nature or spirit thereof, this invention is not restricted thereto except as set forth in the appended claims.

What is claimed is:
1. A method of producing a thermoplastic container serving as a liner for a drum comprising: blow molding a plastic material to desired configuration, said container being tubular and substantially flat end walls, said plastic container having a compressed air-nozzle inlet centrally disposed at an end wall of said container for admission therethrough of an air nozzle during said blow molding operation, said inlet comprising an aperture in the plane of said container end wall in communication with a vertical neck wall sealingly engageable with said air nozzle, providing an outlet integral with said container end wall disposed offset from said air nozzle inlet; removing said air nozzle; applying heat to soften the thermoplastic material of said vertical wall and fusing it to form a seal closing the aperture by sealing said neck in said aperture in a substantially tight and homogeneous manner; and prior to heat sealing, supporting the container end adjacent said inlet during sealing of the aperture by providing a sealing support through said outlet to close said inlet and thereafter heat sealing said vertical wall to fuse the thermoplastic material of said vertical wall and fuse it to form a seal.

2. The method according to claim 1 wherein prior to heat sealing, severing the neck wall at a distance above said aperture and at a distance sufficient to provide sealing material for said aperture.

3. The method according to claim 1 wherein the cylindrical container is formed from a member of the group consisting of polyethylene, polypropylene and ethylene-propylene copolymers.

References Cited by the Examiner

UNITED STATES PATENTS 2,431,537  11/1947  Bogoslowsky _____ 264—320 X
2,876,496  3/1959  Murphy _____ 264—322 X

FOREIGN PATENTS 182,936  3/1963  Sweden.

ROBERT F. WHITE, *Primary Examiner.*

A. R. NOE, *Assistant Examiner.*